(12) United States Patent
Denning

(10) Patent No.: US 10,667,650 B2
(45) Date of Patent: Jun. 2, 2020

(54) CHARCOAL GRILL APPARATUS AND METHOD

(71) Applicant: Matthew Denning, Bridgewater, CT (US)

(72) Inventor: Matthew Denning, Bridgewater, CT (US)

( * ) Notice: Subject to any disclaimer, the term of this patent is extended or adjusted under 35 U.S.C. 154(b) by 155 days.

(21) Appl. No.: 15/786,807

(22) Filed: Oct. 18, 2017

(65) Prior Publication Data

US 2018/0110366 A1   Apr. 26, 2018

Related U.S. Application Data

(60) Provisional application No. 62/411,063, filed on Oct. 21, 2016.

(51) Int. Cl.
*A47J 37/07* (2006.01)
*A23L 5/10* (2016.01)

(52) U.S. Cl.
CPC .............. *A47J 37/079* (2013.01); *A23L 5/10* (2016.08); *A47J 37/0754* (2013.01); *A23V 2002/00* (2013.01); *Y02A 40/928* (2018.01)

(58) Field of Classification Search
CPC .................................................... A47J 37/079

(Continued)

(56) References Cited

U.S. PATENT DOCUMENTS 1,988,318 A * 1/1935 King ................... F24B 13/008
                                                      126/243
4,296,726 A * 10/1981 Ross ..................... A47J 37/079
                                                      126/25 B (Continued)

FOREIGN PATENT DOCUMENTS

KR       1020160039840       4/2016

OTHER PUBLICATIONS

Lee W. Young, International Search Report for PCT/US2017/057505, dated Feb. 15, 2018.

*Primary Examiner* — Avinash A Savani
(74) *Attorney, Agent, or Firm* — Michael A. Blake

(57) ABSTRACT

A charcoal grill apparatus comprising: a cart; an upper surface located on the cart; an ash can opening located on the upper surface; a burner located on the upper surface; a grill kettle, the grill kettle comprising a kettle lid that sits on a lower base section, the lower base section configured to sit on the ash can opening and to sit on the burner; an ash can removably attachable at the underside of the upper surface and aligned with the ash can opening; and an electric blower configured to circulate air from the burner to fuel in the lower base section when the lower base section is sitting on the burner. A method of grilling food, the method comprises: placing charcoal on lower grate in grill kettle; moving lower base section to burner on cart; lighting burner and turning on blower to quickly ignite and prepare charcoal for cooking; moving lower base section to ash can opening on cart, after about 7 minutes; turning off burner and blower; grilling food; emptying coals from lower base section into ash can after allowing to cool; and removing ash can from cart and disposing of coals. A method of grilling food, the method comprises: removing ash can from cart; attaching lower base section to top of ash can; lighting charcoal in lower base section by using the ash can and combustible material to light the charcoal; and grilling food.

18 Claims, 18 Drawing Sheets

(58) Field of Classification Search
USPC .......................................................... 126/243
See application file for complete search history.

(56) References Cited

U.S. PATENT DOCUMENTS

| | | | | |
|---|---|---|---|---|
| 4,382,432 | A | * | 5/1983 | Lizdas ................ A47J 37/0704 126/25 A |
| 4,508,024 | A | | 4/1985 | Perkins |
| 4,603,679 | A | * | 8/1986 | Ogden .................... A47J 37/07 126/25 B |
| 5,027,788 | A | | 7/1991 | Scholsser |
| 5,036,832 | A | * | 8/1991 | Schlosser ............ A47J 37/0704 126/243 |
| 5,331,942 | A | * | 7/1994 | McDonald .......... A47J 37/0694 126/152 B |
| 5,711,209 | A | * | 1/1998 | Guines .................... A47J 37/07 126/25 R |
| 6,182,559 | B1 | * | 2/2001 | Chiang ............... A47J 37/0786 126/25 R |
| 6,394,082 | B1 | * | 5/2002 | Rhynsburger ............. F23J 1/00 126/243 |
| D531,543 | S | * | 11/2006 | Peter ............................... D6/513 |
| D751,186 | S | * | 3/2016 | Romzek ....................... D23/410 |
| 2007/0119444 | A1 | | 5/2007 | Yoon |
| 2012/0090593 | A1 | * | 4/2012 | Urquhart ............... A47J 37/079 126/25 B |
| 2015/0265099 | A1 | | 9/2015 | Coffie |
| 2016/0290653 | A1 | | 10/2016 | Roy |

* cited by examiner

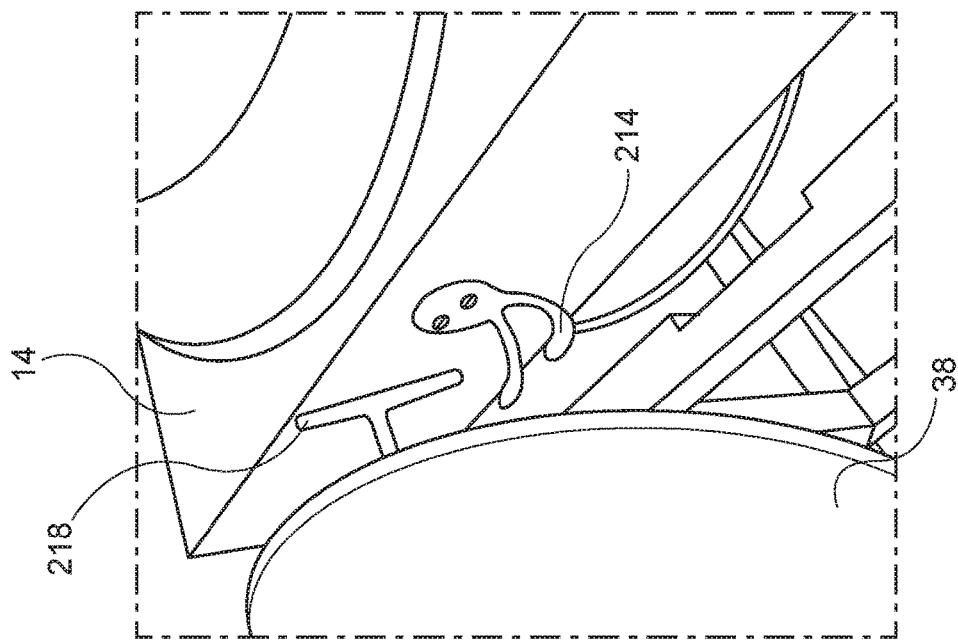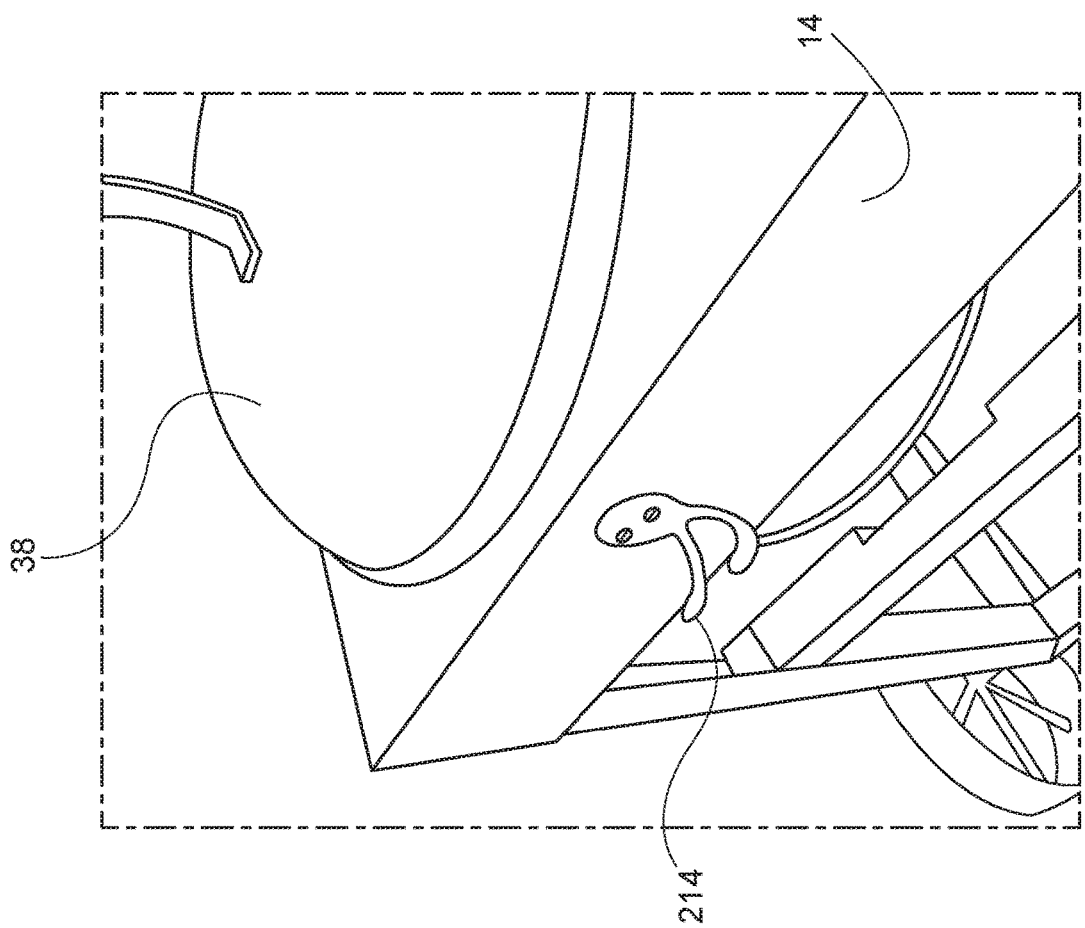

CHARCOAL GRILL APPARATUS AND METHOD

TECHNICAL FIELD

This invention relates generally to the field of outdoor grills and barbecue units, and more specifically, this invention is directed to a barbecue unit capable of accelerated ignition and burn time of charcoal, wood chip, or similar fuel.

BACKGROUND

In recent times, many improvements have been made to barbecue grills. Gas barbecue grills provide faster cooking time and steady temperature control; however, they cannot provide the charcoal or wood flavor that many people prefer and associate with barbecued food. Charcoal and wood fuels are useful for slow-burn qualities because they maintain a high temperature with efficiency of fuel for a lengthy time, but only after said fuel has been burning for a significantly long ignition time. Thus, there is a time delay required to take advantage of the slow-burn qualities of said fuel, hence making charcoal and wood burning grills inconvenient. Often, one must light the charcoal or wood 45 minutes prior to grilling the food.

Therefore, there is a need for an apparatus that overcomes the above described and other disadvantages.

SUMMARY OF THE INVENTION

The invention relates to a charcoal grill apparatus comprising: a cart; an upper surface located on the cart; an ash can opening located on the upper surface; a burner located on the upper surface; a grill kettle, the grill kettle comprising a kettle lid that sits on a lower base section, the lower base section configured to sit on the ash can opening and to sit on the burner; an ash can removably attachable at the underside of the upper surface and aligned with the ash can opening; and an electric blower configured to circulate air from the burner to fuel in the lower base section when the lower base section is sitting on the burner.

The invention also relates to a method of grilling food, the method comprises: placing charcoal on lower grate in grill kettle; moving lower base section to burner on cart; lighting burner and turning on blower to quickly ignite and prepare charcoal for cooking; moving lower base section to ash can opening on cart, after about 7 minutes; turning off burner and blower; grilling food; emptying coals from lower base section into ash can after allowing to cool; and removing ash can from cart and disposing of coals.

In addition, the invention relates to a method of grilling food, the method comprises: removing ash can from cart; attaching lower base section to top of ash can; lighting charcoal in lower base section by using the ash can and combustible material to light the charcoal; and grilling food.

BRIEF DESCRIPTION OF THE DRAWINGS

The present disclosure will be better understood by those skilled in the pertinent art by referencing the accompanying drawings, where like elements are numbered alike in the several figures, in which:

FIG. 24 is a view of the side of the cart with a hanger hook;
FIG. 25 is a view of the side of the cart with a hanger hook, and the kettle lid on the cart.

DETAILED DESCRIPTION

Figure 1:
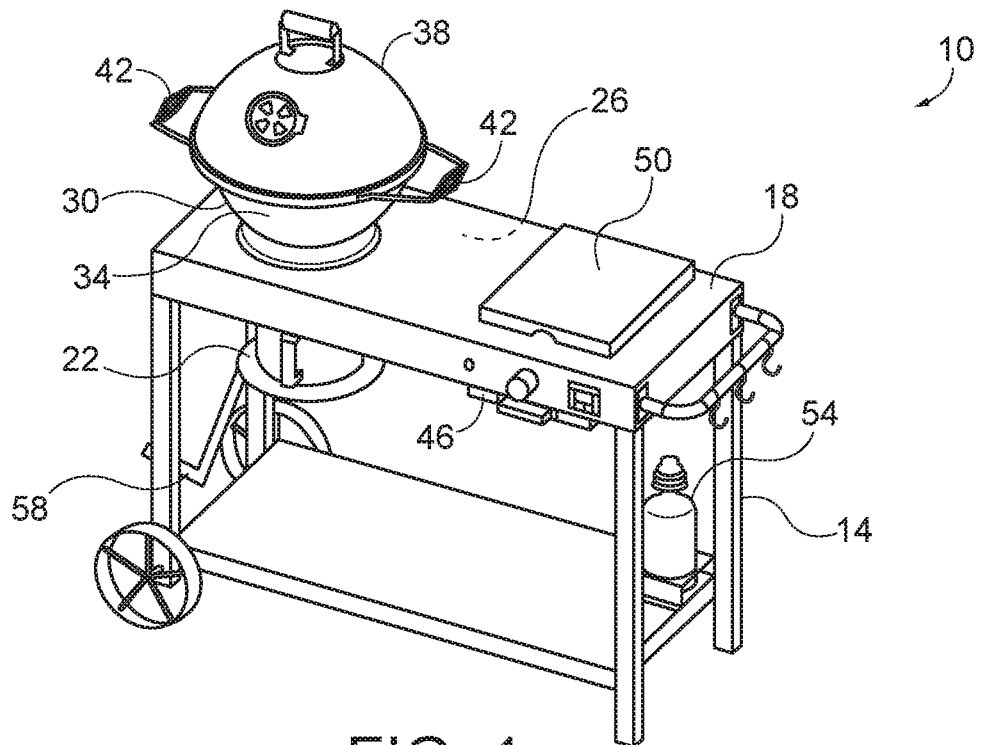
FIG. 1 is a front perspective view of the charcoal grill.

FIG. 1 shows a front perspective view of an open embodiment of the improved charcoal grill 10. The grill 10 comprises a cart 14, the cart comprises an upper surface 18. An ash can 22 is removably attached to the left side and underside 26 of the upper surface 18. A grill kettle 30 is removably attached to the upper surface 18, and is aligned with the ash can 22. The grill kettle 30 comprises a lower base section 34 and a kettle lid 38. The base section 34 may have two handles 42. A blower-burner assembly 46 is located on the right side of the upper surface 18. The blower-burner assembly 46 comprises a burner lid 50 that may be removable and/or rotatable with respect to the upper surface 18. A propane tank 54 is in operable communication with the blower-burner assembly 46.

Figure 2:
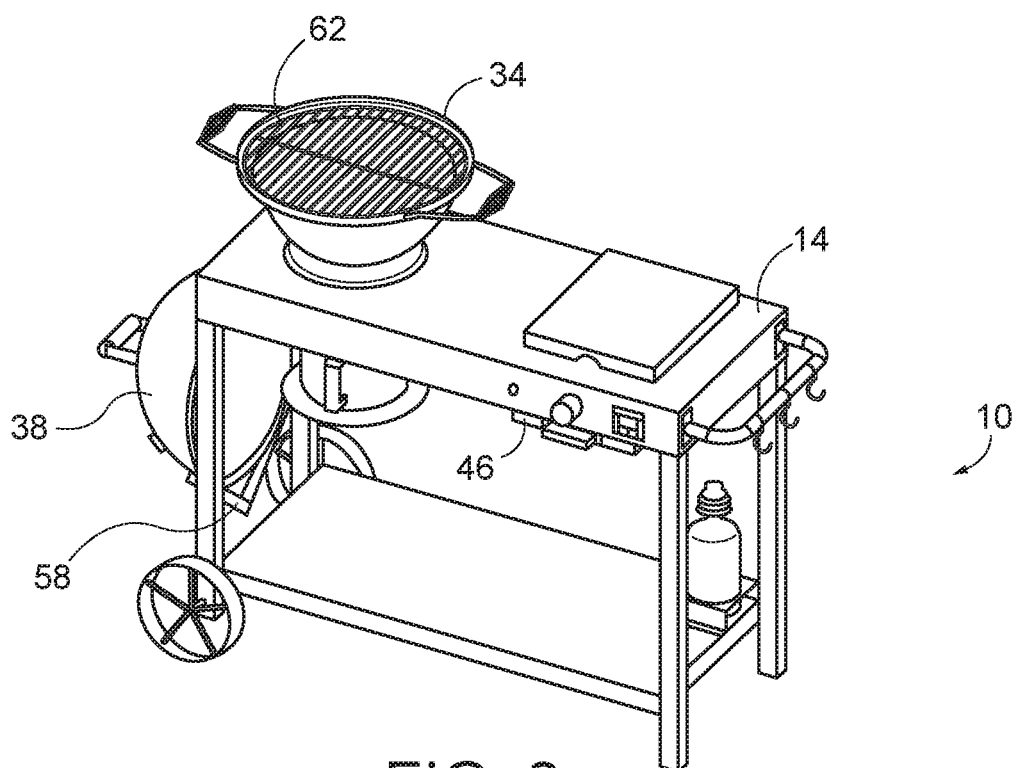
FIG. 2 is a front perspective view of the charcoal grill, with the kettle lid removed.

FIG. 2 is the improved charcoal grill 10 from FIG. 1, with the kettle lid 38 removed and stored on a storage rack 58 on the side of the cart 14. In this view, the upper grill grate 62 is visible in the lower base section 34.

Figure 3:
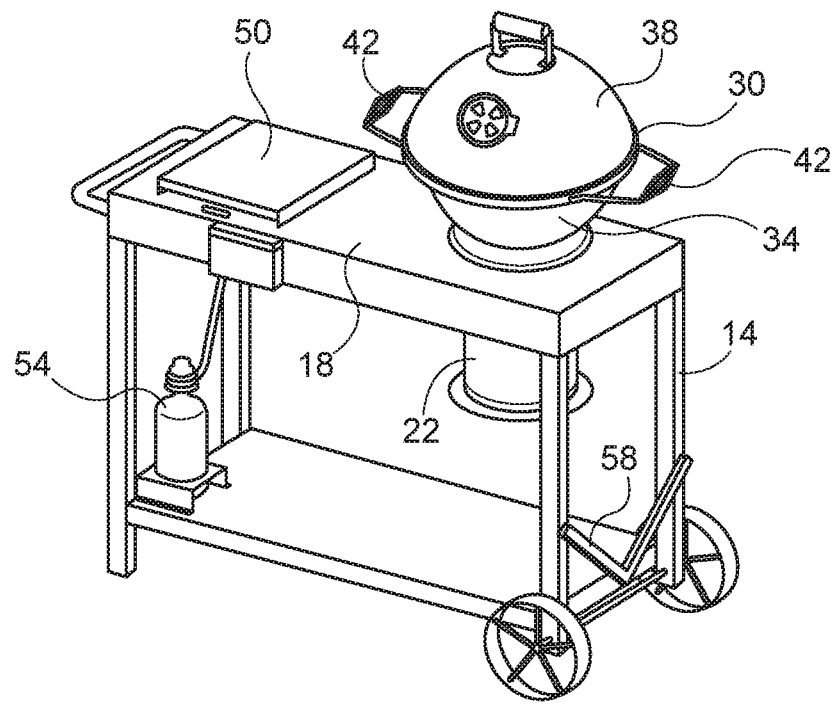
FIG. 3 is a rear perspective view of the charcoal grill from FIG. 1.

FIG. 3 is a rear perspective view of the improved charcoal grill 10 from FIG. 1.

Figure 4:
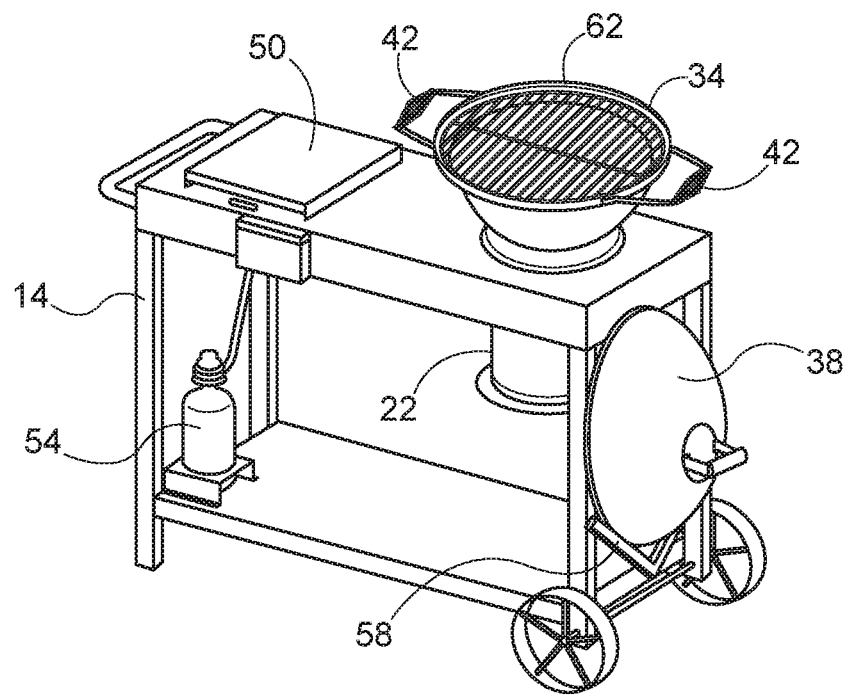
FIG. 4 is a rear perspective view of the charcoal grill from FIG. 2.

FIG. 4 is a rear perspective view of the improved charcoal grill 10 from FIG. 2.

Figure 5:
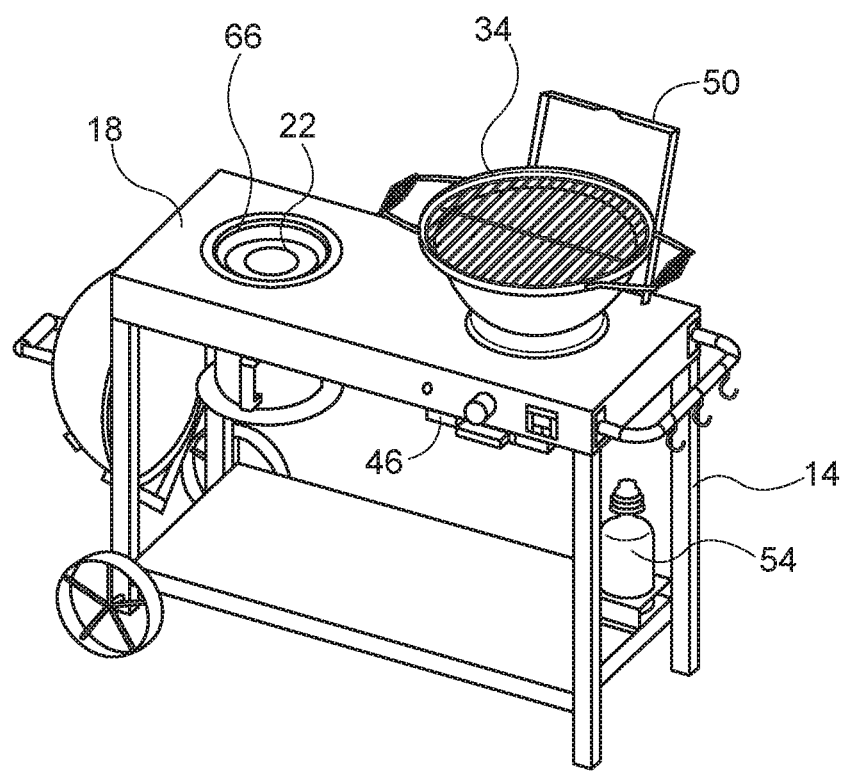
FIG. 5 is a front perspective view of the charcoal grill, with the grill kettle moved to the burner.

FIG. 5 is a view of the improved charcoal grill 10 from FIG. 2, but with the lower base section 34 of the grill kettle 30 placed on the burner of the burner-blower assembly 46 with burner lid 50 rotated up and out of the way of the lower base section 34. The burner will be shown in more detail at FIG. 9. The top of the ash can 22 can be seen in the ash can opening 66 of the upper surface 18 now that the lower base section 34 has been moved. The burner is supplied with propane from the propane tank 54. In addition, there is an adjustable blower that is part of burner-blower assembly 46, that supplies air to the burner.

Figure 6:
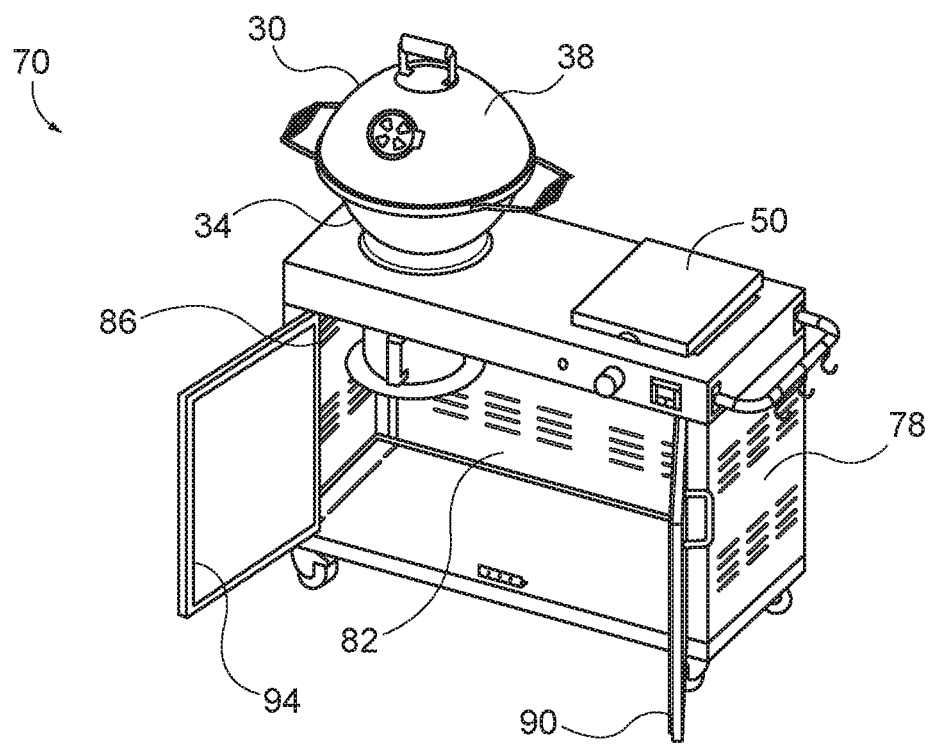
FIG. 6 is a front perspective of a charcoal grill with an enclosed cart.

FIG. 6 is another embodiment of the improved charcoal grill 70. In this embodiment, the cart 74 is generally enclosed with three vented walls 78, 82, 86, and two doors 90, 94.

Figure 7:
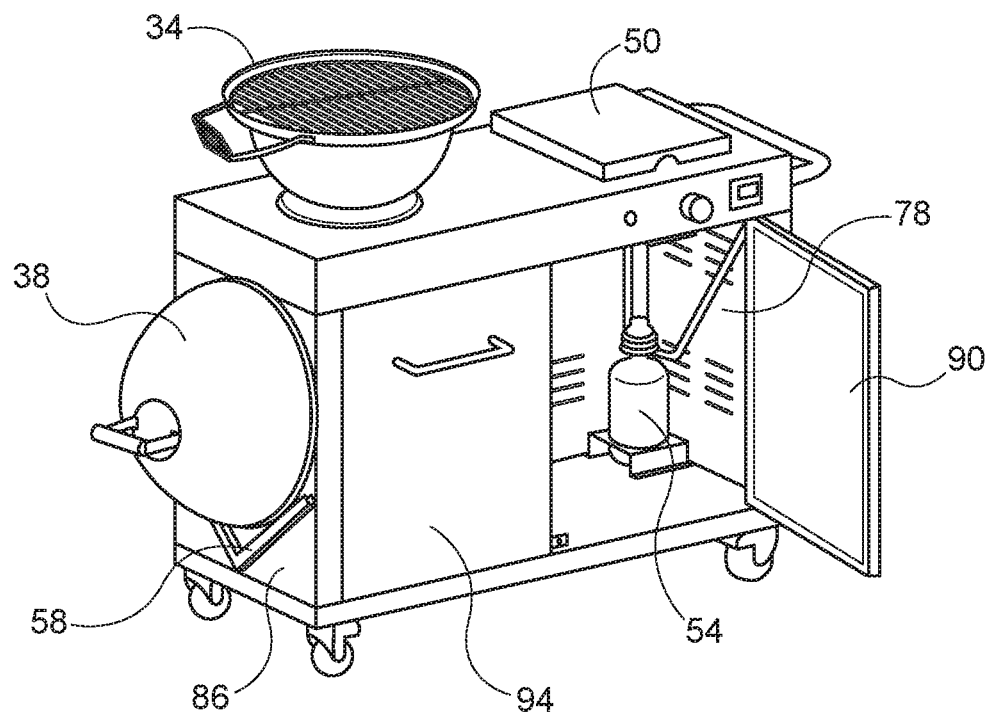
FIG. 7 is a front perspective of the charcoal grill from FIG. 6, with the kettle lid hanging from the cart.

FIG. 7 is the improved charcoal grill 70 from FIG. 6, but with the kettle lid 38 stored in the storage rack 58.

Figure 8:
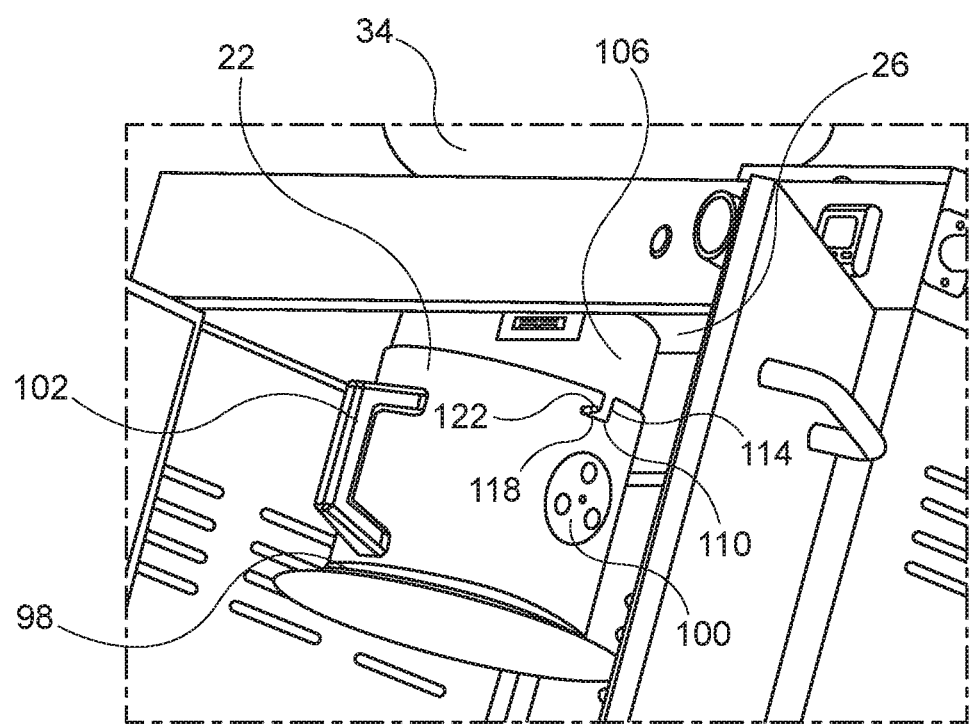
FIG. 8 is a close up view of an ash can attached to the cart.

FIG. 8 is a close-up of the ash can 22. In this view, one can see that the ash can 22 has a base 98 at its bottom end, and a handle 102 on its side. The underside 26 has an ash can collar 106. The ash can 22 is configured to slide over and removably attach to the ash can collar 106. In one embodiment, the ash can 22 may attach to the ash can collar 106 via two sets of slots 110 (only one of the set of slots is visible in this view), located on the ash can 22. The slot 110 may comprise a vertical portion 114 and a horizontal portion 118. Two pins 122 may be located on the ash can collar 106 (only one of the pins is visible in this view). Thus, the ash can 22 can be attached to the ash can collar 106 by lining up the two pins 122 with the vertical portions 114 of the slots 110, sliding the ash can 22 up until the pins are abutting the horizontal portion 118 of the slots 110, and rotating the ash can 22 until the pins 122 are resting against the end of the horizontal portion 118 of the slot 110 that is distal from the vertical portion 118 of the slot 110. The ash can 22 may have adjustable air vents 100 that can be opened, closed, and partially opened.

Figure 9:
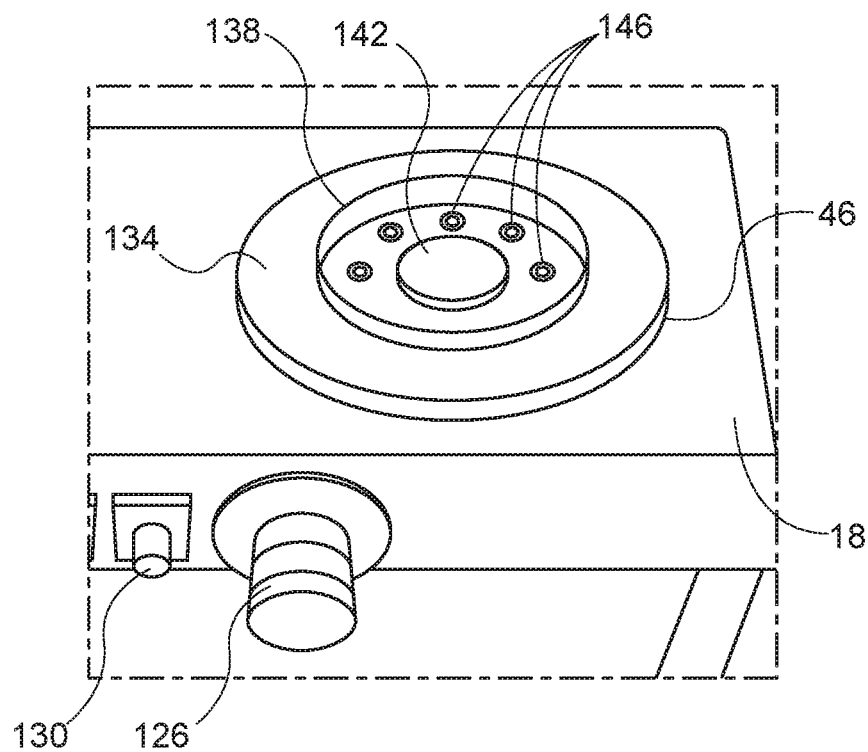
FIG. 9 is a close up view of the burner-blower assembly on the cart.

FIG. 9 is a close up view of the burner-blower assembly 46. The burner-blower assembly 46 comprises a gas valve 126, and a variable speed switch 130 which controls the blower. A base plate 134 is located on the upper surface 18. Extending upward from the base plate is a kettle insert collar 138. The kettle insert collar 138 is configured to receive the lower base section 34 of the kettle, which has kettle collar 140 (seen in FIG. 16) configured to accept the kettle insert collar 138. The bottom of the lower base section 34 has a fire opening 178 (seen in FIG. 15), generally located concentrically within the kettle collar 140. Within the kettle insert collar 138, is a burner ring 142. The burner ring 142 is in fluid communication with the propane tank 54. A plurality of blower vents 146 are located around the burner ring 142. The blower vents 146 are in fluid communication with the blower (not shown in this Figure).

Figure 10:
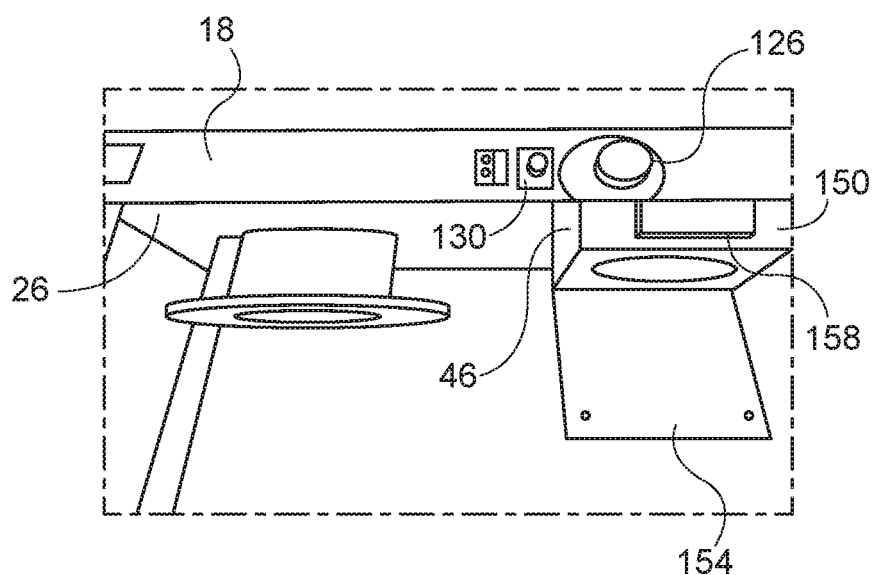
FIG. 10 is a close up view of the burner-blower assembly under the upper surface of the cart.

FIG. 10 is a view of the underside 26 of the upper surface 18. In this view, the housing 150 for the burner-blower assembly 46 can be seen. In this view, an access door 154 is opened to reveal the interior of the housing 150. A battery pack 158 may be attached to the side of the housing 150. The battery pack 158 is configured to power the blower.

Figure 11:
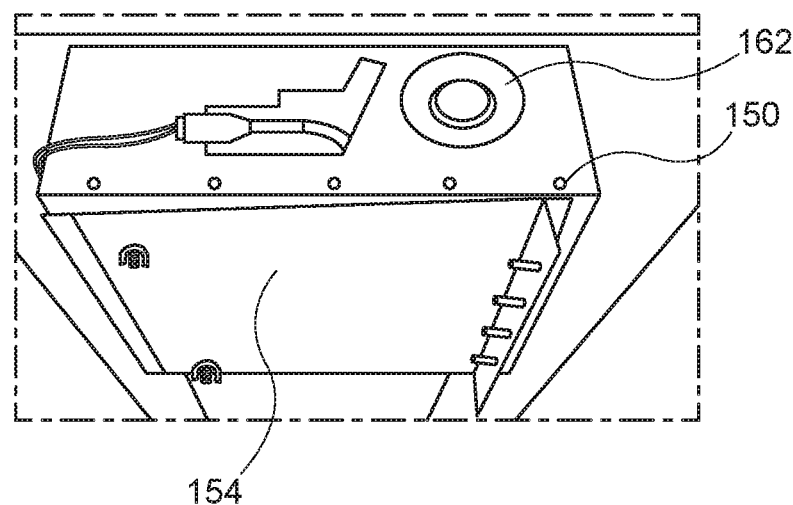
FIG. 11 is a close up view of the burner-blower assembly with the access door closed.

FIG. 11 is a close up view of the housing 150. In this view, the access door 154 is closed. The blower inlet opening 162 can be seen in the side of the housing 150.

Figure 12:
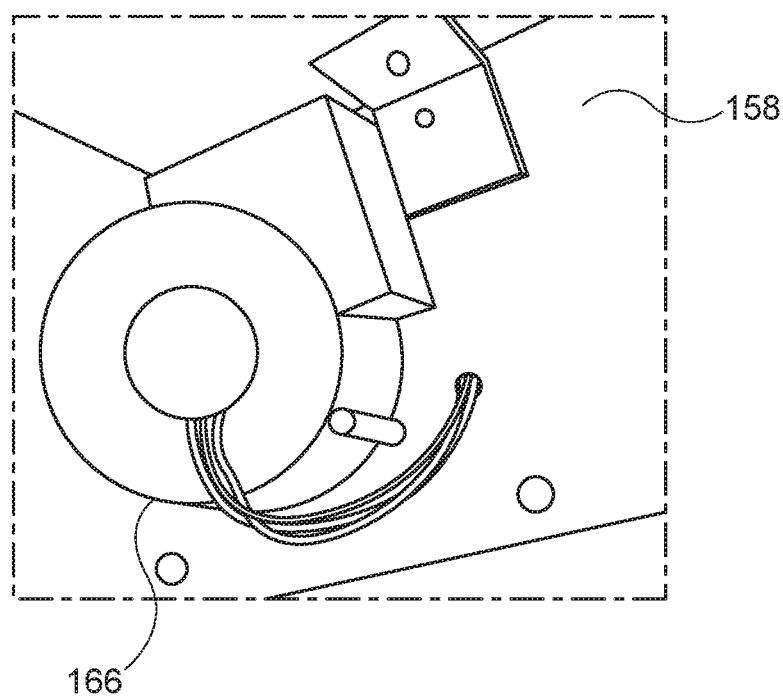
FIG. 12 is a close up view of the blower.

FIG. 12 is a close up view of the interior of the housing 150. In this view, the blower 166 can be seen attached to the housing 150.

Figure 13:
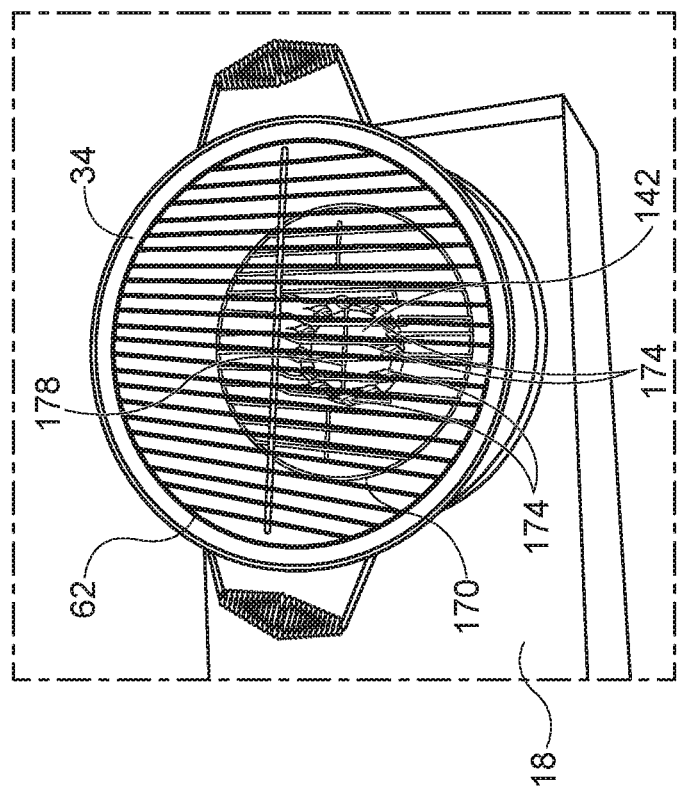
FIG. 13 is a top view of the lower base section sitting on a burner.

FIG. 13 is a top perspective view of the improved charcoal grill 10. In this view, the lower base section 34 has been set into the insert collar 138. The lower base 34 section has a fire opening 178 in its bottom side. The upper grill grate 62 is visible, as is the lower grate 170. The burner ring 142 can be seen, with flames 174 emanating from the burner ring.

Figure 14:
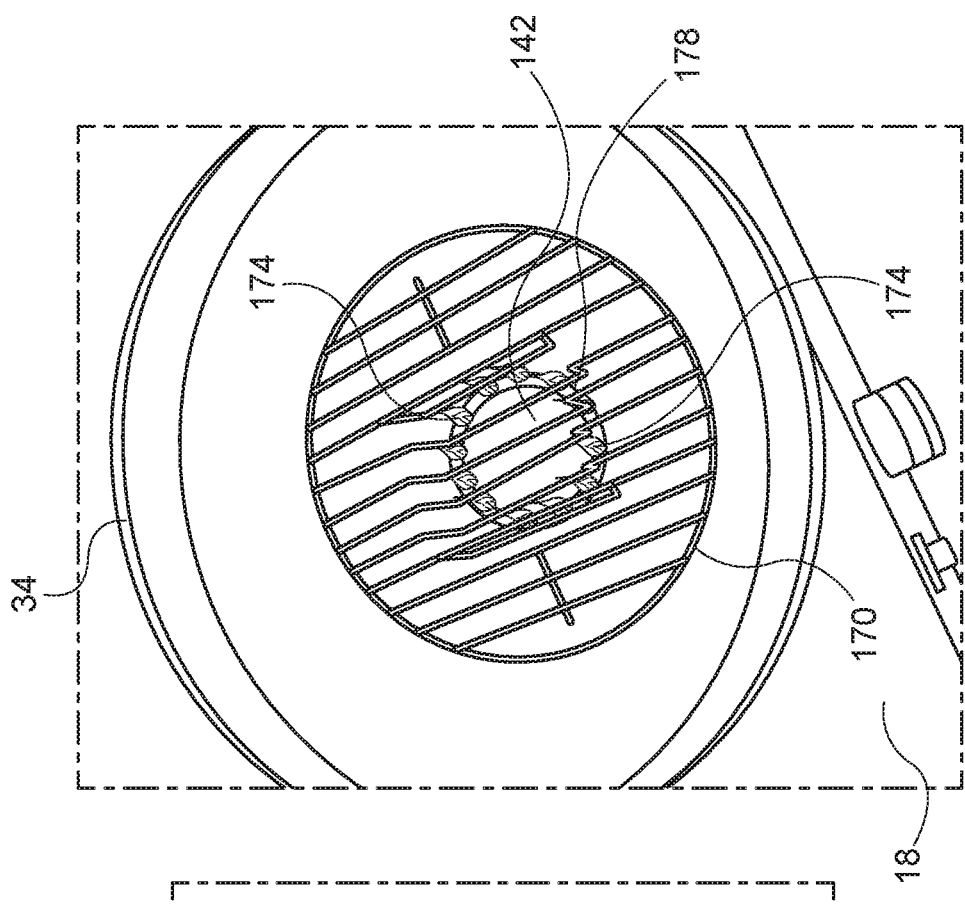
FIG. 14 is a close up view of the lower base section from FIG. 13.

FIG. 14 is a close up view of the lower base section 34 from FIG. 13. In this view, the upper grill grate 62 has been removed.

Figure 15:
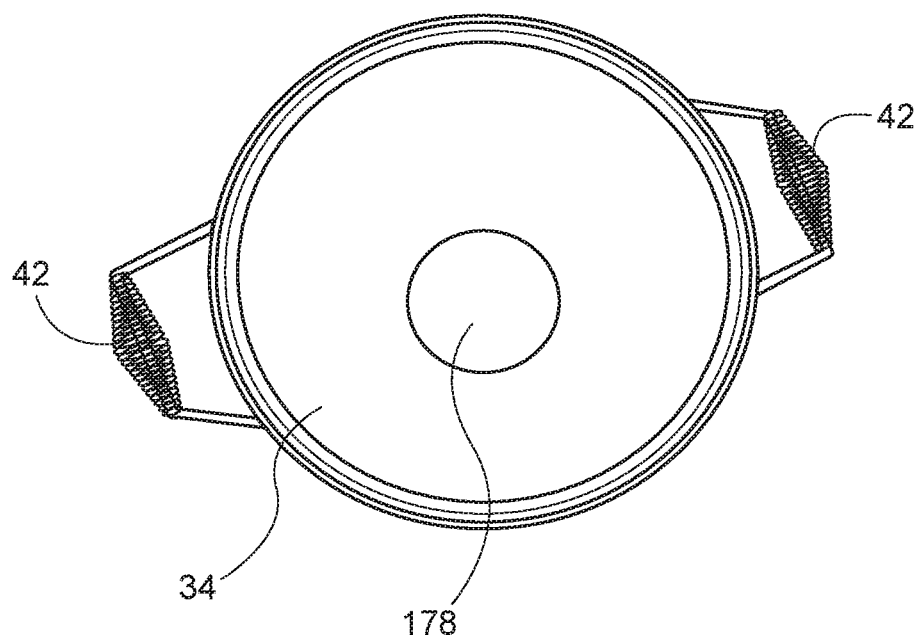
FIG. 15 is a top view of the lower base section with the grates removed.

FIG. 15 shows the lower base section 34 with the grates 62, 170 removed. Here one can clearly see the fire opening 178.

Figure 16:
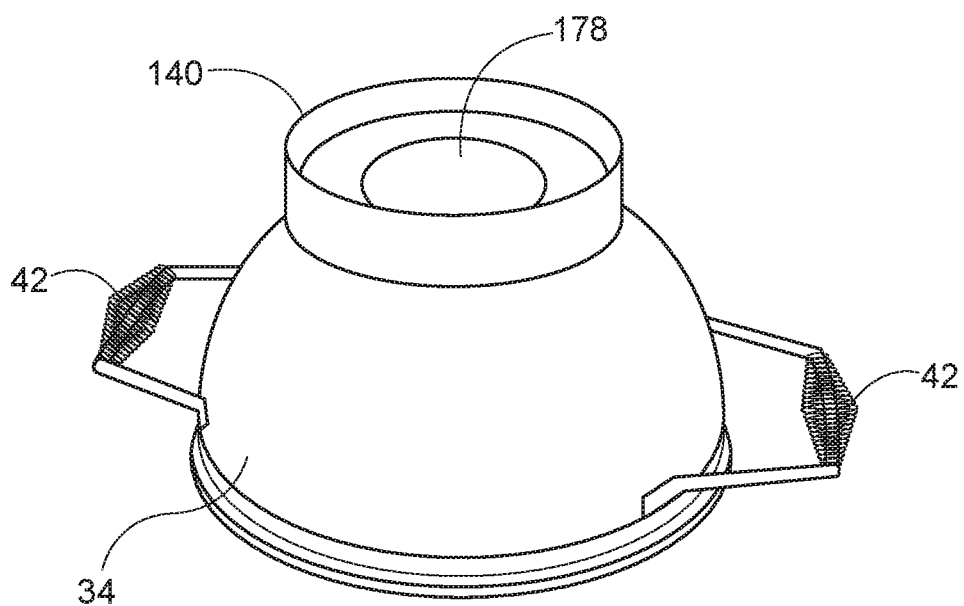
FIG. 16 is a view of the underside of the lower base section.

FIG. 16 is bottom view of the lower base section 34. In this view, the fire hole 178 can be seen located concentrically within the kettle collar 140.

Figure 17:
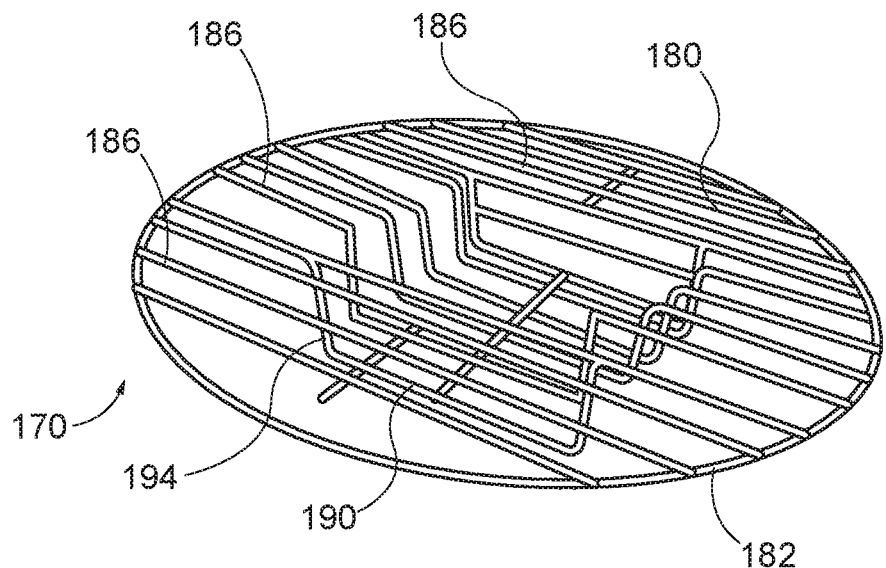
FIG. 17 is a perspective view of the lower grate.

FIG. 17 is a top perspective view of a lower grate 170. The lower grate 170 is used to hold the charcoal or other suitable fuel for the grill. The lower grate 170 has a first planar surface 180 that is generally in the same plane as the outer perimeter 182 of the lower grate 170, within 1 diameter of the individual wire members 186 that make up the grate 170. The first planar surface 180 is generally defined by the wire members 186 and the portion of the wire members 186 that are generally in the same plane as the outer perimeter 182 of grate 170, or at least within 1 diameter of the wire members 186. The grill grate 170 also has a second planar surface 190 that is below the first planar surface 180, and is parallel to the first planar surface. The second planar surface 190 are formed by the wire members 186 that are angled downward from the first planar surface 180 to form a kind of pocket 194 in the center of the grill grate 170. The pocket 194 is configured to hold coals, or other fuel, while the lower base section 34 is located on the burner-blower assembly 46, so that the burner-blower assembly can quickly heat and have the coals ready for grilling food in a short amount of time, around 7 minutes.

Figure 18:
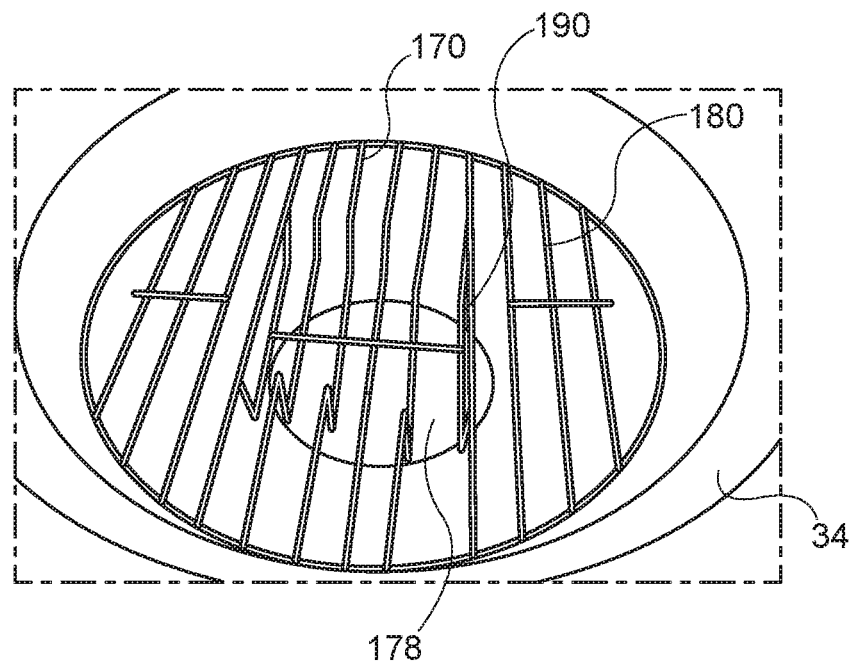
FIG. 18 is a top perspective view of the lower grate from FIG. 17.

FIG. 18 shows the lower grate 170 in the bottom of the lower base section 34. The second planar surface 190 is closer to the fire opening 178 than the first planar surface 180 when the lower grate 170 is properly installed in the lower base section 34.

Figure 19:
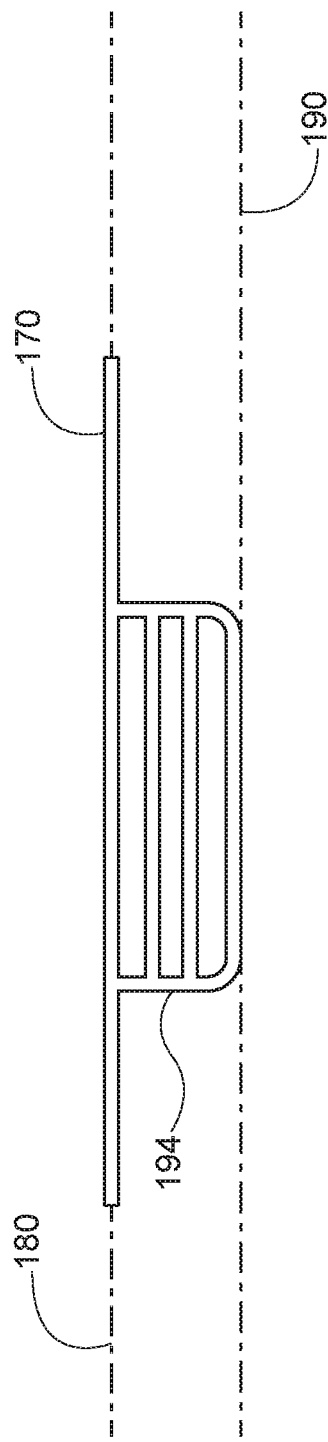
FIG. 19 is a side view of the lower grate.

FIG. 19 is a side view of the lower grate 170. The first planar surface 180 is represented by the line 180, and the second planar surface 190 is represented by the line 190.

Figure 20:
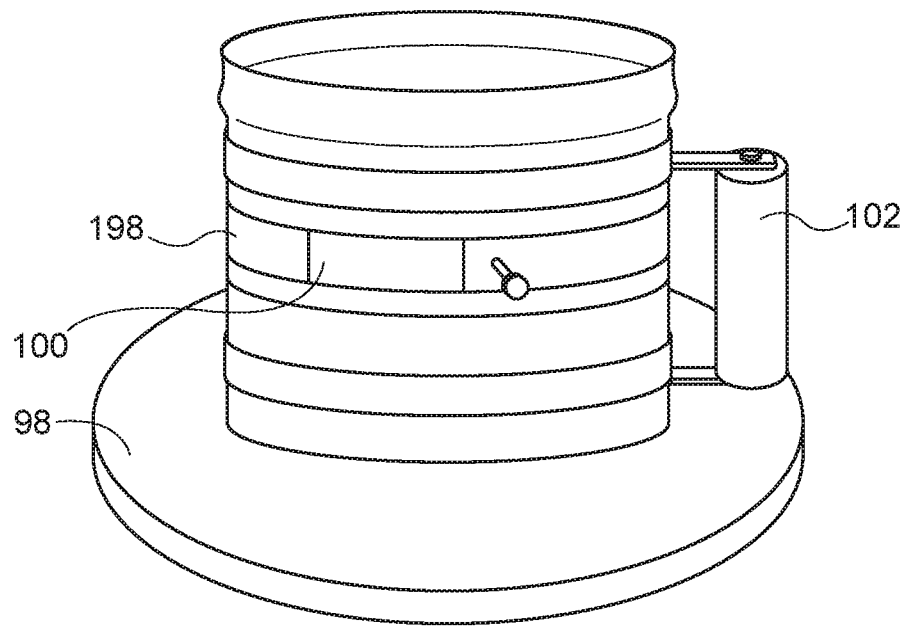
FIG. 20 is a front perspective view of the ash can.

FIG. 20 is a front perspective view of another embodiment of the ash can 198. In the embodiment shown in FIG. 8, the ash can had slots 110. However, in the embodiment of FIG. 20, the ash can 198 does not have slots, but rather pins 202, see FIG. 21.

Figure 21:
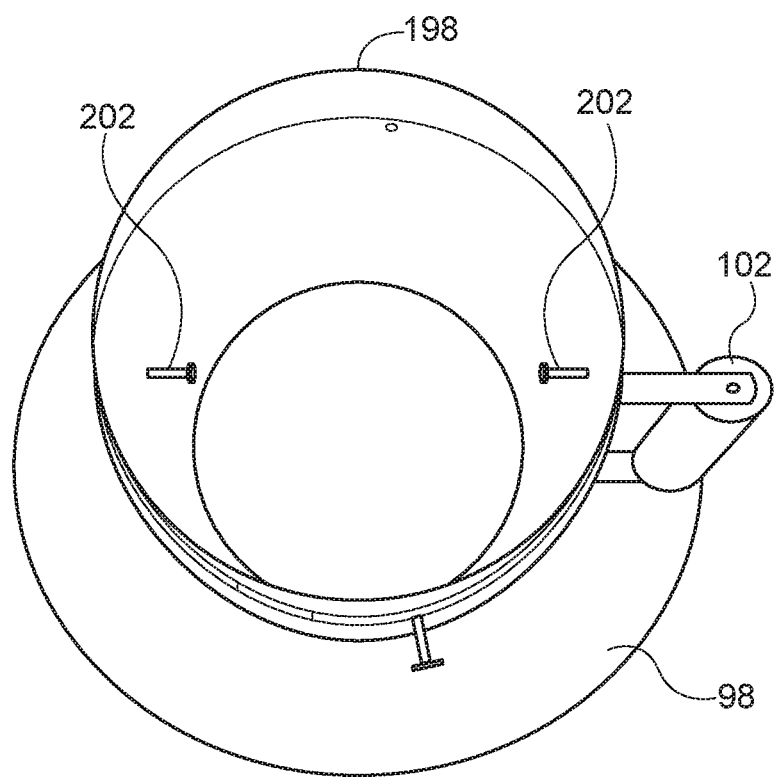
FIG. 21 is a top perspective view of the ash can.

FIG. 21 is a top perspective view of the ash can 198 from FIG. 20. In this figure, the pins 202 can be seen on the interior of the ash can 198.

Figure 22:
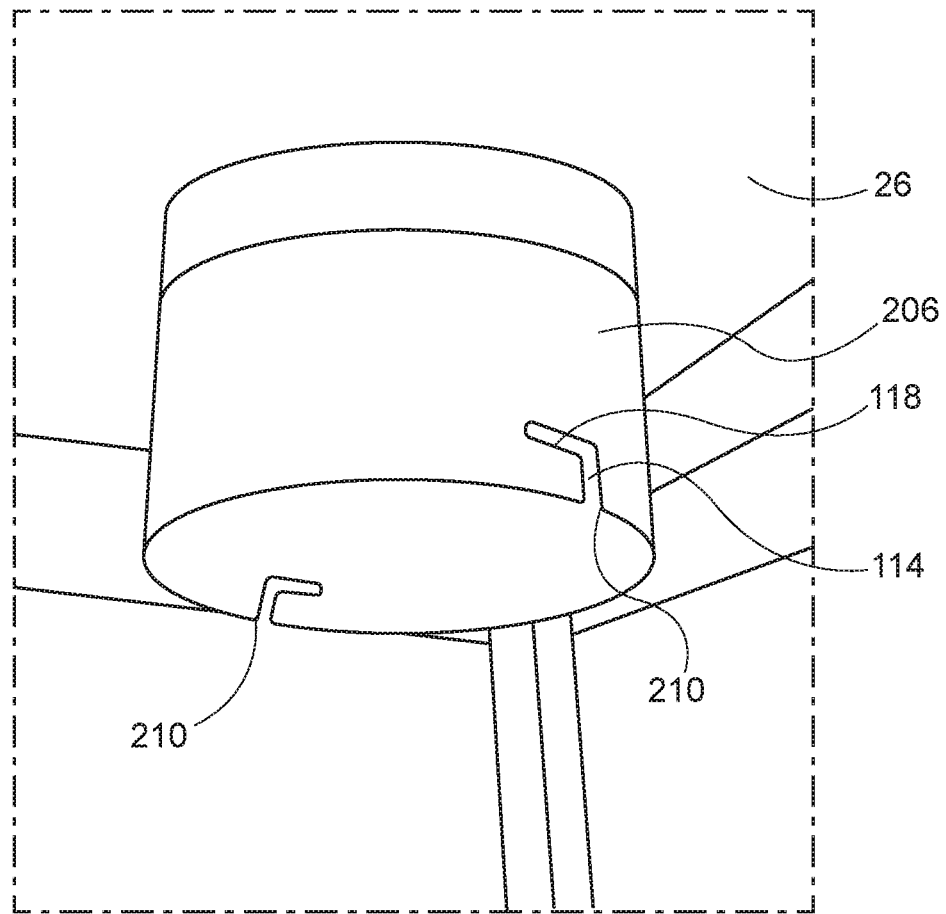
FIG. 22 a view of the ash can collar.

FIG. 22 shows another embodiment of the collar 206 on the underside 26. In this embodiment, the ash can collar 106 has two sets of slots 210. The slots 210 may comprise a vertical portion 114 and a horizontal portion 118. Thus, the ash can 22 can be attached to the ash can collar 106 by lining up the two pins 122 with the vertical portions 114 of the slots 210, sliding the ash can 22 up until the pins are abutting the horizontal portion 118 of the slots 210, and rotating the ash can 198 until the pins 202 are resting against the end of the horizontal portion 118 of the slot 210 that is distal from the vertical portion 118 of the slot 210.

Figure 23:
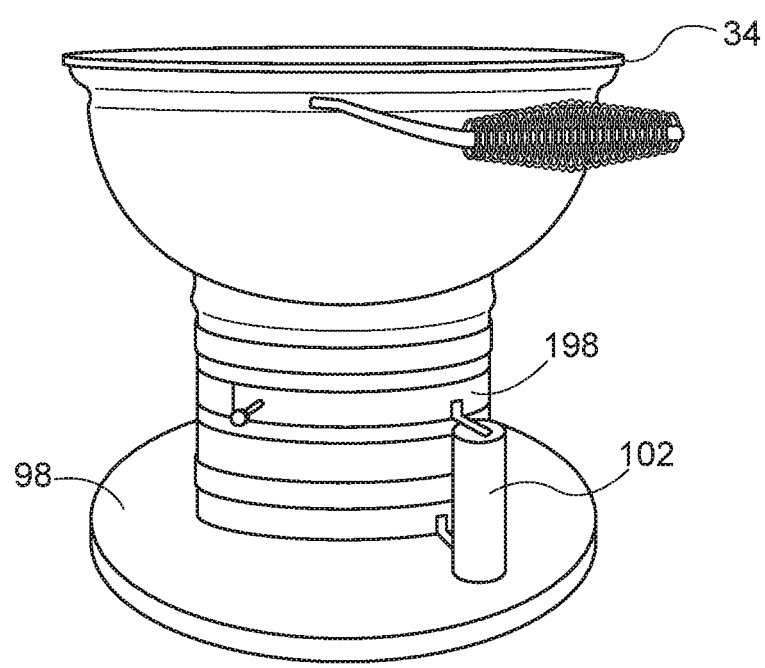
FIG. 23 is a view of the lower base section attached to the ash can.

FIG. 23 shows how the lower base section 34 of the kettle 30 can be removed from the grill cart 14 and placed directly on the ash can 198 when the ash can 198 is removed from the grill cart 14. This allows one to use the kettle 30 and ash can 198 as a portable grill without requiring the need of the grill cart 14 and burner-blower assembly 46. In one embodiment of use, one can simply take the kettle 30 from the burner-blower assembly, once the charcoal are ready for cooking, and place the lower base section 34 onto the ashcan 198. In another embodiment of use, one can simply place charcoal in the lower base section 34 on the lower grate 170, and light the charcoal using the ash can as a charcoal chimney. In this embodiment, one can place newspaper (or any other suitable combustible material) in the ash can 198, and light the newspaper. Next, with the lower base section 34 sitting on the ash can 198, and the air vents 100 opened in the ash can, the ash can 198 will act as charcoal chimney, and the flames from the newspaper will ignite the charcoal in the lower base section 34. In this way, one can have a portable barbeque grill, without the need to use toxic lighter fluid, or instant light charcoal with lighter fluid already infused in the coal.

FIG. 24 shows the grill cart 14 with the kettle lid 38 on the cart 14. The grill cart has a double hook hanger 214 on the side of the cart 14.

FIG. 25 shows a close up of the kettle lid 38, where a t-handle 218 is shown connected to the perimeter of the kettle lid 38. The t-handle 218 is configured to allow one to hang the kettle lid 38 from the double hook hanger 214.

Figure 26:
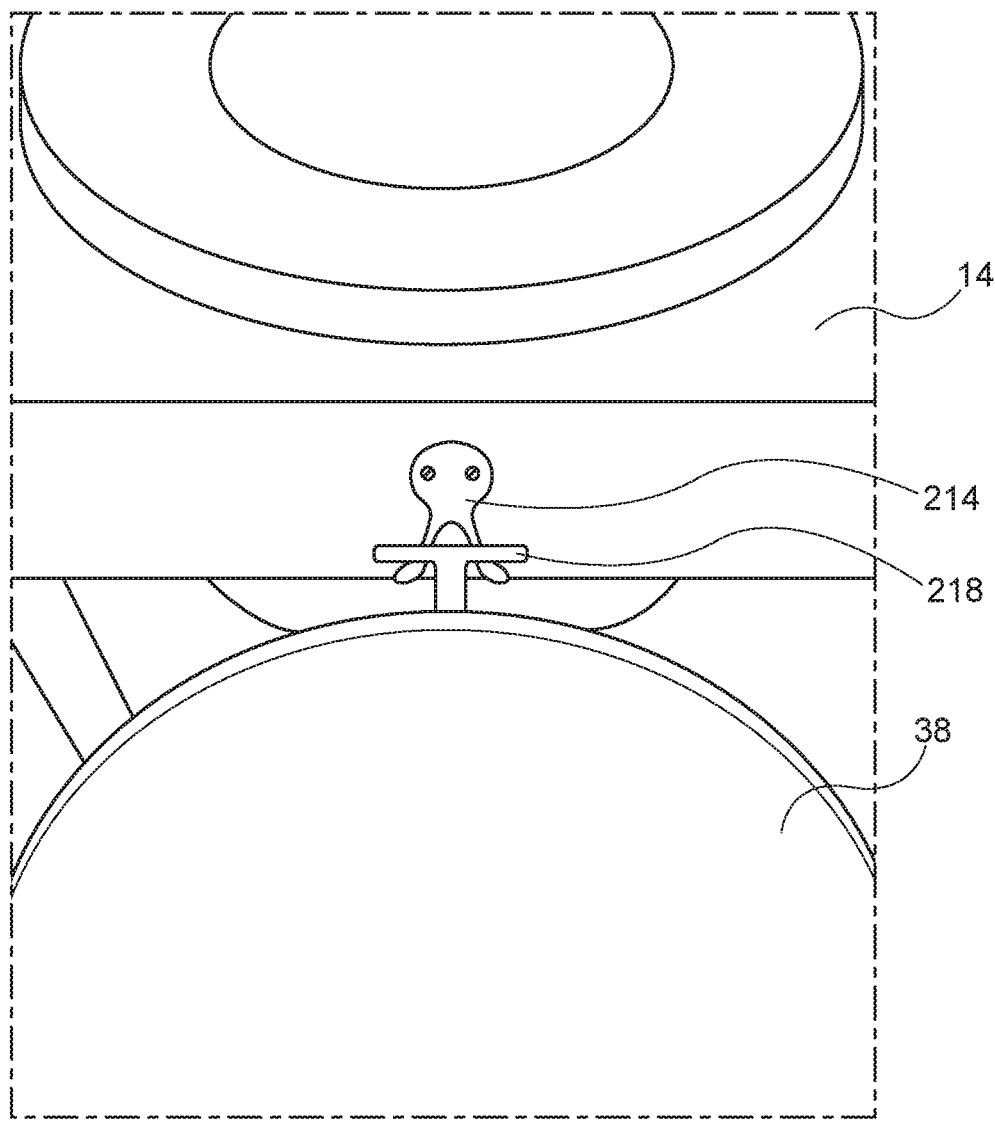
FIG. 26 is a view of the side of the cart with the kettle lid hanging from the hanger hook.

FIG. 26 shows the kettle lid 38 hanging from the double hook hanger 214 by the t-handle 218.

Figure 27:
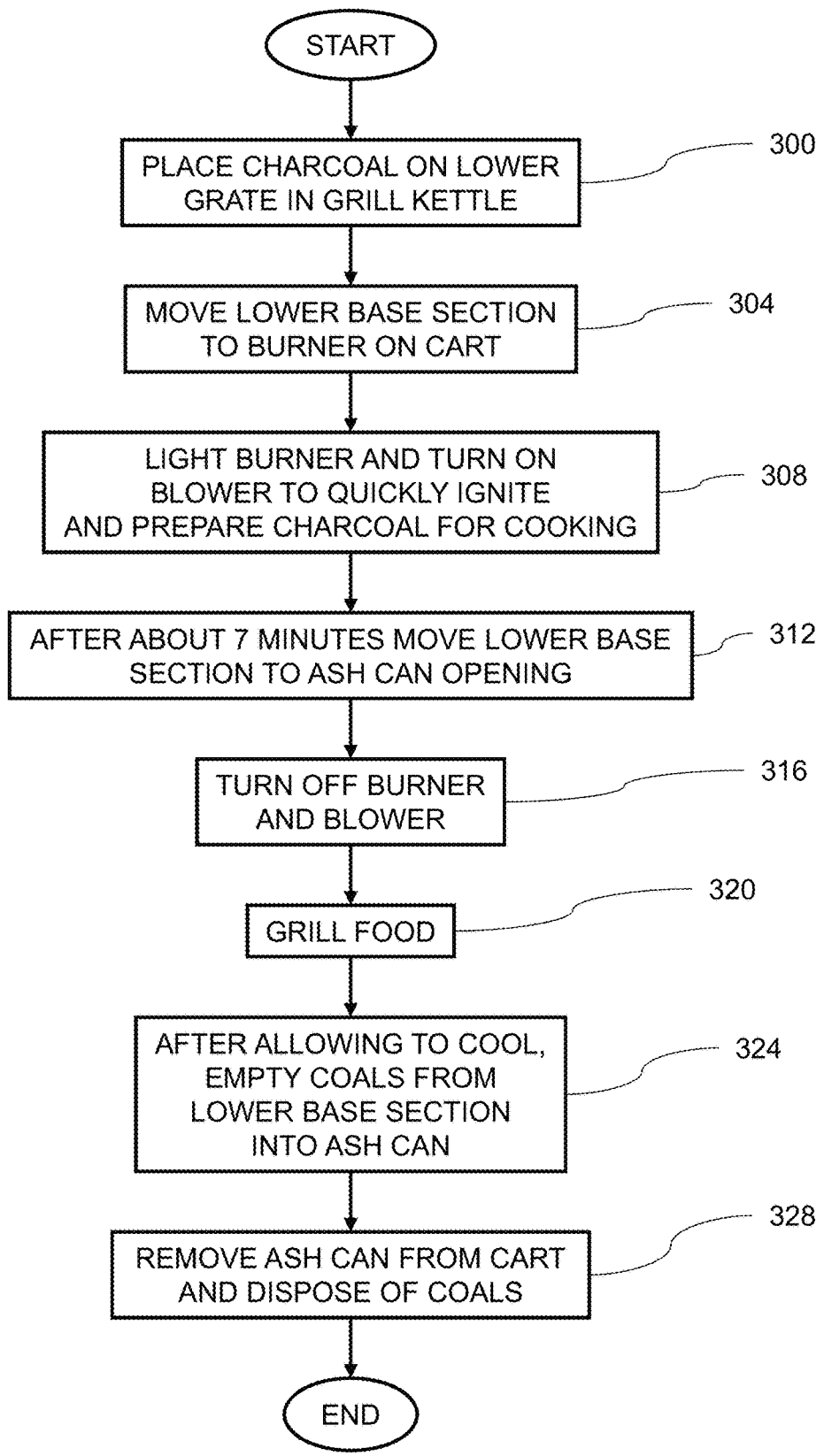
FIG. 27 is a flowchart embodying one method of using the charcoal grill.

FIG. 27 shows a flowchart embodying one method of using the improved charcoal grill apparatus. At act 300, place charcoal on the lower grate of the lower base section of the grill. At act 304, move the lower base section to the burner on the cart. At act 308, light burner and turn on blower to quickly ignite and prepare charcoal for cooking. At act 308, the burner, and the airflow from the blower will quickly ignite and burn the charcoal so that it will generally be ready for grilling food in about 7 minutes. This compares to waiting 30 minutes to 45 minutes after lighting charcoal, for the charcoal to be ready to grill food. At act 312, move the lower base section to the ash can opening, after about 7 minutes on the burner. At act 316, turn off the burner and the blower. At act 320 grill food. At act 324, after allowing to cool, empty coals from lower base section into the ash can. At act 328, remove ash can from cart, and dispose of used and cooled coals.

Figure 28:
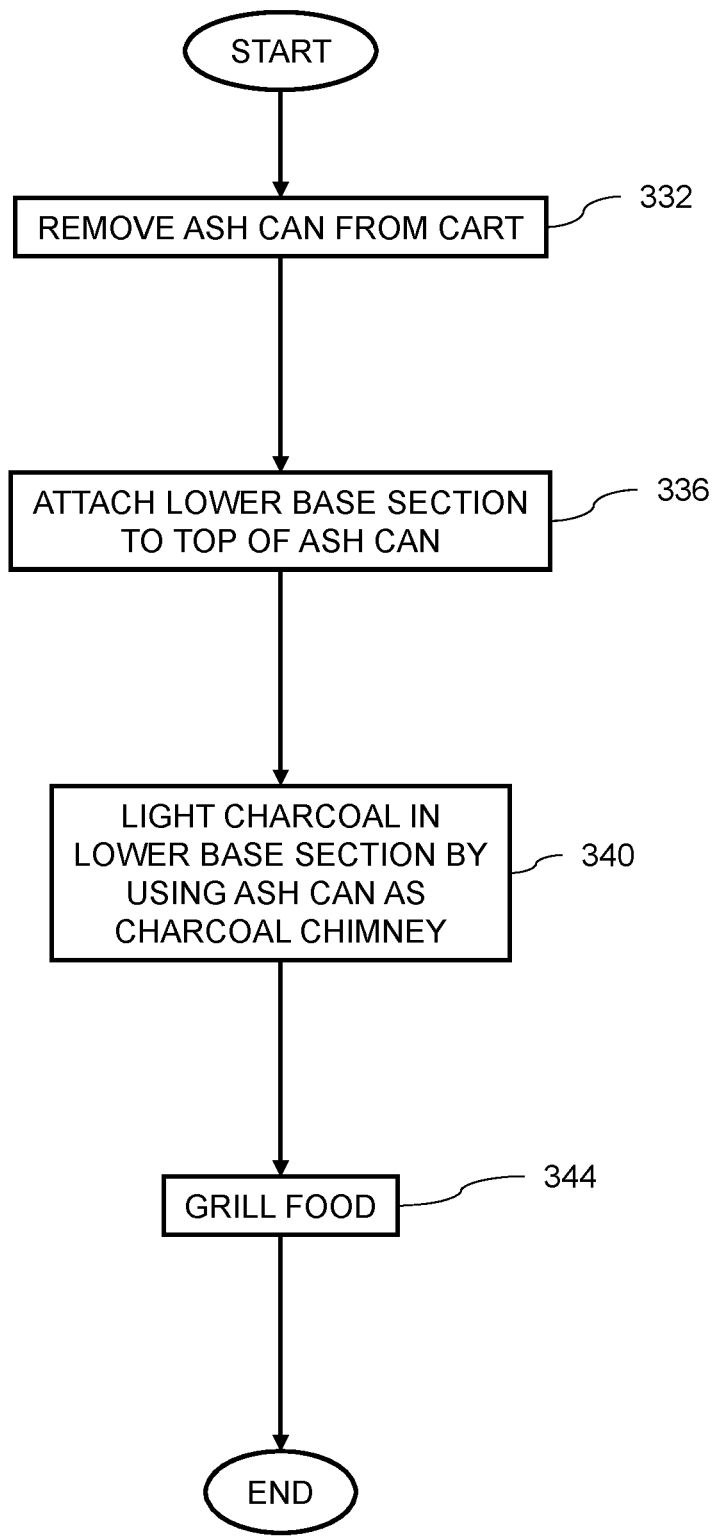
FIG. 28 is a flowchart embodying another method of using the charcoal grill.

FIG. 28 shows a flowchart embodying another method of using the improved charcoal grill apparatus. At act 332, remove the ash can from the cart. At act 336, attach the lower base section to the top of the ash can. At act 340, light charcoal in grill kettle by using the ash can as a charcoal chimney. One can place newspaper (or any other suitable combustible material) in the ash can 198, and light the newspaper. Next, with the lower base section 34 sitting on the ash can 198, and the air vents 100 opened in the ash can, the ash can 198 will act as charcoal chimney, and the flames from the newspaper will ignite the charcoal in the lower base section 34. At act 344, grill the food. This method, allows one to using the grill kettle and ash can as a portable grill that can be easily transported without having to use the cart and burner-blower assembly. The ash can will act as a stand for the grill kettle.

The disclosed invention has many advantages. It allows one to grill food using charcoal, but without having to wait 30 to 45 minutes for the charcoal to t become covered with ash and be ready for grilling food. The disclosed invention uses the burner and blower to quickly prepare the charcoal so that it is properly covered with ash in about 7 minutes, and be ready for grilling. The disclosed invention allows one to remove the ash can and grill kettle, and attached the grill kettle to the ash can, to use as a portable grill. Using the disclosed grill, one does not have to use lighter fluid, instant light charcoal, or other accelerant which may be toxic, and makes the food taste bad. Using the disclosed grill means having a clean combustion.

It should be noted that the terms "first", "second", and "third", and the like may be used herein to modify elements performing similar and/or analogous functions. These modifiers do not imply a spatial, sequential, or hierarchical order to the modified elements unless specifically stated.

While the disclosure has been described with reference to several embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiments disclosed as the best mode contemplated for carrying out this disclosure, but that the disclosure will include all embodiments falling within the scope of the appended claims.

What is claimed is:

1. A charcoal grill apparatus comprising:
a cart;
an upper surface located on the cart;
an ash can opening located on the upper surface;
a burner located on the upper surface;
a grill kettle, the grill kettle comprising:
   a lower base section;
   a kettle lid configured to sit on the lower base section;
   a lower grill grate configured to sit near the bottom of the lower base section;
   the lower base section configured to sit on the ash can opening and to sit on the burner, and the lower grill grate configured to hold a plurality of charcoal pieces;
an ash can removably attachable at the underside of the upper surface and aligned with the ash can opening, the ash can comprising:
a middle portion;
a bottom portion located below the middle portion;
an ash can floor located adjacent to the bottom portion;
adjustable air vents located in the middle portion or the bottom portion of the ash can;
an electric blower configured to circulate air from the burner to fuel in the lower base section when the lower base section is sitting on the burner;
a kettle collar extending from the bottom of the lower base section;
an unobstructed fire opening located in the bottom of the lower base section, and located concentrically within the kettle collar;
a kettle insert collar extending from the top of the upper surface, and located concentric to the burner;
the kettle collar configured to slide into the ash can opening, with the fire opening aligned with the ash can opening, the kettle collar also configured to slide into the kettle insert collar, with the fire opening aligned with the burner, and the fire opening configured to allow flames from the ash can to light the plurality of charcoal pieces;

the ash can and grill kettle configured to be removable from the cart; and the ash can configurable to hold combustible materials on the ash can floor and to act as a charcoal chimney to light the charcoal on the lower grill grate after the combustible materials have been lit, and the fire opening configured to allow flames from the combustible material held in the ash can to light the plurality of charcoal pieces, and the ash can further configured set on the ground or other surface to support the grill kettle off the ground or other surface while in use.

2. The charcoal grill apparatus of claim 1, further comprising:
an ash can collar extending from the bottom of the upper surface, the ash can collar concentric with the ash can opening;
the ash can removably attachable to the ash can collar.

3. The charcoal grill apparatus of claim 2, wherein the kettle collar of the lower base section is configured to slide into the ash can, thereby forming a portable grill system and stand.

4. The charcoal grill apparatus of claim 3, further comprising:
a first pin located on the interior of the ash can;
a second pin located on the interior of the ash can;
a first slot in the ash can collar, the first slot comprising a vertical portion, and a horizontal portion;
a second slot in the ash can collar, the first slot comprising a vertical portion, and a horizontal portion;
wherein the ash can is removably attachable to the ash can collar by lining up the first pin to the vertical portion of the first slot and by lining up the second pin to the vertical portion of the second slot; turning the ash can so the first pin abuts against the end of the horizontal portion of the first slot that is distal from the vertical portion of the first slot and the second pin abuts against the end of the horizontal portion of the second slot that is distal from the vertical portion of the second slot.

5. The charcoal grill apparatus of claim 3, further comprising:
a first pin located on the exterior of the ash can collar;
a second pin located on the exterior of the ash can collar;
a first slot in the ash can, the first slot comprising a vertical portion, and a horizontal portion;
a second slot in the ash can, the first slot comprising a vertical portion, and a horizontal portion;
wherein the ash can is removably attachable to the ash can collar by lining up the first pin to the vertical portion of the first slot and by lining up the second pin to the vertical portion of the second slot; turning the ash can so the first pin abuts against the end of the horizontal portion of the first slot that is distal from the vertical portion of the first slot and the second pin abuts against the end of the horizontal portion of the second slot that is distal from the vertical portion of the second slot.

6. The charcoal grill apparatus of claim 1, further comprising a battery pack attached to the cart, the battery pack in electrical communication with the electric blower.

7. The charcoal grill apparatus of claim 1, further comprising a propane tank removably attached to the cart, the propane tank in fluid communication with the burner.

8. The charcoal grill apparatus of claim 1, further comprising adjustable air vents located on the ash can.

9. The charcoal grill apparatus of claim 1, further comprising a variable speed controller in signal communication with the electric blower.

10. The charcoal grill apparatus of claim 1, further comprising:
a lower grill grate configured to sit near the bottom of the lower base section, the lower grill grate comprising:
an outer perimeter;
a plurality of individual wire members attached to the outer perimeter, the individual wire members having a diameter;
a first planar surface that is generally in the same plane as the outer perimeter or is parallel to the outer perimeter plane and within 1 diameter of the outer perimeter plane;
a second planar surface that is below the first planar surface and is parallel to the first planar surface, the second planar surface formed by the individual wire members which are angled downward from the first planar surface to form a pocket with a floor in the center of the lower grill grate, the floor being in the same plane as the second planar surface, the pocket is configured to hold coals, or other fuel;
an upper grill grate configured to sit in the lower base section generally above the lower grill grate, and further configured to support food that is to be grilled in the lower base section.

11. The charcoal grill apparatus of claim 1, further comprising:
a first handle located on the exterior of the lower base section;
a second handle located on the exterior of the lower base section, and about a 180° from the first handle.

12. A charcoal grill apparatus comprising:
a grill kettle, the grill kettle comprising:
a lower base section;
a lower grill grate configured to sit near the bottom of the lower base section, the lower grill grate configured to hold a plurality of charcoal pieces;
an unobstructed fire opening located in the bottom of the lower base section;
an ash can configured to removably attach to the lower base section at the top of the ash can, such that the grill kettle is configured to be removed from the ash can by lifting the kettle from the ash can or lowering the ash can from the grill kettle, the ashcan comprising:
a middle portion;
a bottom portion located below the middle portion;
an ash can floor located adjacent to the bottom portion;
adjustable air vents located in the middle portion or the bottom portion of the ash can;
the ash can configurable to hold combustible materials on the ash can floor and to act as a charcoal chimney to light the charcoal on the lower grill grate after the combustible materials have been lit, and the fire opening configured to allow flames from the combustible material held in the ash can to light the plurality of charcoal pieces; and the ash can further configured set on the ground or other surface to support the grill kettle off the ground or other surface while in use.

13. The charcoal grill apparatus of claim 12, wherein the grill kettle further comprises a kettle lid configured to removably sit on the lower base section.

14. The charcoal grill apparatus of claim 12, wherein the ash can is configured to be removably attachable to an ash can collar located on a bottom side of an upper surface of a grill cart.

15. The charcoal grill apparatus of claim 12, wherein the lower grill grate further comprises:
   an outer perimeter;
   a plurality of individual wire members attached to the outer perimeter, the individual wire members having a diameter;
   a first planar surface that is generally in the same plane as the outer perimeter or is parallel to the outer perimeter plane and within 1 diameter of the outer perimeter plane;
   a second planar surface that is below the first planar surface and is parallel to the first planar surface, the second planar surface formed by the individual wire members which are angled downward from the first planar surface to form a pocket with a floor in the center of the lower grill grate, the floor being in the same plane as the second planar surface, the pocket is configured to hold coals, or other fuel.

16. The charcoal grill apparatus of claim 15, wherein the ash can further comprises:
   an upper grill grate configured to sit in the lower base section generally above the lower grill grate.

17. The charcoal grill apparatus of claim 12, wherein the when the ash can receives the grill kettle, the grill kettle cannot rotate with respect to the ash can.

18. The charcoal grill apparatus of claim 12, further comprising legs removably attachable to the ash can, and configured to hold the charcoal grill apparatus off the ground.

* * * * *